(12) United States Patent
Nakamoto et al.

(10) Patent No.: US 8,676,062 B2
(45) Date of Patent: Mar. 18, 2014

(54) OPTICAL TRANSMISSION APPARATUS AND METHOD

(75) Inventors: Kenichi Nakamoto, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 12/585,012

(22) Filed: Aug. 31, 2009

(65) Prior Publication Data

US 2009/0324254 A1    Dec. 31, 2009

Related U.S. Application Data

(63) Continuation of application No. PCT/JP2007/056936, filed on Mar. 29, 2007.

(51) Int. Cl.
*H04B 10/572* (2013.01)

(52) U.S. Cl.
USPC ............ 398/192; 398/194; 398/195; 398/196

(58) Field of Classification Search
USPC .................................. 398/182, 192, 194–197
See application file for complete search history.

(56) References Cited

U.S. PATENT DOCUMENTS

| | | | | |
|---|---|---|---|---|
| 5,182,756 A | * | 1/1993 | Waki et al. ................. | 372/38.02 |
| 5,187,717 A | | 2/1993 | Horita et al. | |
| 5,394,418 A | * | 2/1995 | Shiozawa ................. | 372/29.021 |
| 6,516,017 B1 | * | 2/2003 | Matsumoto ................ | 372/50.11 |
| 6,996,142 B2 | | 2/2006 | Kai et al. | |
| 2002/0154592 A1 | * | 10/2002 | Tanaka et al. ................. | 369/121 |
| 2004/0190572 A1 | * | 9/2004 | Kawanishi ................. | 372/38.02 |
| 2004/0228384 A1 | | 11/2004 | Oh et al. | |
| 2006/0088068 A1 | * | 4/2006 | Farrell et al. ............... | 372/29.02 |
| 2006/0221436 A1 | * | 10/2006 | Benz et al. ................. | 359/337.2 |

FOREIGN PATENT DOCUMENTS

| | | |
|---|---|---|
| EP | 0 480 697 B1 | 6/1994 |
| EP | 1 478 064 A1 | 11/2004 |
| JP | 04-147686 | 5/1992 |
| JP | 07-273400 | 10/1995 |
| JP | 11-238943 | 8/1999 |
| JP | 2002-134829 | 5/2002 |
| JP | 2003-198049 | 7/2003 |
| JP | 2004-186336 | 7/2004 |
| JP | 2004-343043 | 12/2004 |
| JP | 2005-064300 | 3/2005 |
| JP | 2007-258592 | 10/2007 |
| JP | 2008-085214 | 4/2008 |

OTHER PUBLICATIONS

Hiroyuki Ishii et al., "A Tunable Distributed Amplification DFB Laser Diode (TDA-DFB-LD)", IEEE Photonics Technology Letters, vol. 10, No. 1. Jan. 1998, 3 pages.
International Search Report for PCT/JP2007/056936, mailed Apr. 24, 2007.

* cited by examiner

*Primary Examiner* — David C. Payne
*Assistant Examiner* — Tanya Motsinger
(74) *Attorney, Agent, or Firm* — Fujitsu Patent Center

(57) ABSTRACT

In an optical transmission apparatus, a light-emitting laser varies its output wavelength when applied with a wavelength control signal for switching wavelengths. A wavelength controller outputs the wavelength control signal, and a filter unit subjects the wavelength control signal to a filtering process to remove high-frequency noise superimposed on the wavelength control signal. The filter unit stops the filtering process during the wavelength control and executes the filtering process during the operation.

18 Claims, 20 Drawing Sheets

OPTICAL TRANSMISSION APPARATUS AND METHOD

This application is a continuation application filed under 35 U.S.C. §111(a), of International Application PCT/JP2007/056936, filed in Japan on Mar. 29, 2007, and designated United States.

FIELD

The embodiments discussed herein are related to optical transmission apparatus and methods.

BACKGROUND

With the recent increase of data traffic, high-speed, large-capacity communications have become indispensable, so that the construction of large-capacity networks using communication technologies such as DWDM (Dense Wavelength Division Multiplexing) is being advanced. Also, in anticipation of the realization of even larger-capacity data transmission in the future, the construction of next-generation photonic networks capable of dynamic wavelength switching and routing is hoped for. As a solution to the implementation of such networks, variable-wavelength light source device has been attracting attention which is capable of outputting a desired wavelength.

FIG. 17 illustrates the configuration of a variable-wavelength light source device, or more specifically, a temperature tunable-type variable-wavelength light source device 30 using an 8-channel DFB (Distributed Feedback)-LD (Laser Diode) array.

The variable-wavelength light source device 30 comprises DFB-LDs 31-1 to 31-8, an optical coupler 32, and an SOA (Semiconductor Optical Amplifier) 33. The wavelength output end of each of the DFB-LDs 31-1 to 31-8 and the wavelength input end of the SOA 33 are coupled by the optical coupler 32 such that the wavelength output from one of the DFB-LDs 31-1 to 31-8 is amplified by the SOA 33 and output to the outside of the device.

FIG. 18 illustrates the operation of the variable-wavelength light source device 30, wherein the horizontal axis indicates wavelength and the vertical axis indicates optical power. Specifically, FIG. 18 schematically depicts wavelength ranges H1 to H8 respectively covered by the eight DFB-LDs 31-1 to 31-8 of the variable-wavelength light source device 30.

The DFB-LD 31-1 outputs a desired wavelength variable within the wavelength range H1, the DFB-LD 31-2 outputs a desired wavelength variable within the wavelength range H2, and so on. Thus, the DFB-LD 31-8 outputs a desired wavelength variable within the wavelength range H8.

To cause the variable-wavelength light source device 30 to output a wavelength λa, indicated in FIG. 18, as a variable wavelength output, for example, first, the DFB-LD 31-1 with the wavelength range H1 including the wavelength λa is selected from among the DFB-LDs 31-1 to 31-8. Then, the laser temperature is varied and set to a laser temperature Ta for outputting the wavelength λa.

In this manner, when a desired wavelength is to be output from the variable-wavelength light source device, the DFB-LD to which is allocated the wavelength range including the desired wavelength is selected, and the laser temperature is adjusted so that the desired wavelength may be output from the selected DFB-LD.

As stated above, the variable-wavelength light source device is constructed by monolithically integrating a DFB laser array, an optical coupler and an optical amplifier on a single chip and permits one of multiple wavelengths to be output therefrom by the selection of a DFB laser and the temperature control. The variable-wavelength light source device can replace multiple light sources that are needed for respective wavelengths in conventional WDM systems, making it possible to reduce costs of WDM systems and simplify the maintenance and management of the systems.

As conventional techniques related to the variable-wavelength light source, a technique has been proposed wherein, at the time of switching wavelengths, an electric current is injected into a semiconductor laser, and after the temperature becomes stable, the power supply to the laser diode (LD) is controlled (e.g., Japanese Laid-open Patent Publication No. 2005-64300).

The temperature tunable-type light source like the above one has been mainly used until now as the variable-wavelength light source device. Since this type of light source device has a construction such that the refractive index in the laser diode active layer is varied by the application of heat, however, the tuning speed is slow in principle and of the order of milliseconds (ms). Thus, the temperature tunable type is unsuitable for high-speed applications such as high-speed wavelength switching and high-speed wavelength routing. In recent years, therefore, current injection-type variable-wavelength light source devices capable of high-speed tuning on the order of nanoseconds (ns) have been developed.

FIG. 19 illustrates the structure of a current injection-type DFB-LD. A gain control layer (act) 301 and a tuning layer (tuning) 302 are alternately arranged on a waveguide 300 (the gain control layer 301 is a layer that contributes to the emission of light, and the tuning layer 302 is a layer for wavelength setting), and electrodes 303 are arranged atop so as to correspond in position to the alternately arranged layers. Also, a grating (diffraction grating) 304 is formed beneath the gain control layer 301 and the tuning layer 302.

Thus, in the current injection-type variable-wavelength light source device, the wavelength control layer is provided in the waveguide separately from the gain control layer. The set wavelength is controlled by injecting an activation current into the gain control layer to control the power of the laser diode and also by injecting a tuning current into the tuning layer to vary the carrier density and thereby change the refractive index. By virtue of the aforementioned structure and control, high-speed tuning of the nanosecond (ns) order can be achieved.

In the current injection-type variable-wavelength light source device, however, noise superimposed on the tuning current directly appears in the form of wavelength variation, causing spectral linewidth broadening. Thus, if an optical signal with a broadened wavelength spectrum is transmitted during the operation, a problem arises in that conspicuous waveform degradation occurs.

FIG. 20 illustrates the relationship between current noise and transmission penalty, wherein the horizontal axis indicates noise frequency (kHz) and the vertical axis indicates transmission penalty (dB) (transmission penalty: a measure of the rate of discrimination error in the received signal attributable to transmission). FIG. 20 reveals that the transmission-induced degradation worsens with increase in the noise frequency of the tuning current.

In order to improve transmission characteristics, therefore, high-frequency noise needs to be suppressed. In a conventional method for suppressing high-frequency noise superimposed on the tuning current, a bypass capacitor is arranged in the vicinity of a tuning current generating section, for example, to allow the cutoff frequency to be set to a lower frequency, thereby suppressing the high-frequency noise.

With this method, however, the tuning speed lowers because of the time constant of the capacitor, giving rise to a problem that the intended high-speed tuning (high-speed wavelength switching) fails to be attained.

SUMMARY

According to one aspect of the present invention, an optical transmission apparatus includes a variable-wavelength light source including a light-emitting laser whose output wavelength varies when applied with a wavelength control signal for switching wavelengths, a wavelength controller configured to output the wavelength control signal, and a filter unit configured to subject the wavelength control signal to a filtering process to remove high-frequency noise superimposed on the wavelength control signal, wherein the filter unit stops the filtering process during wavelength control and executes the filtering process during operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Figure 1:
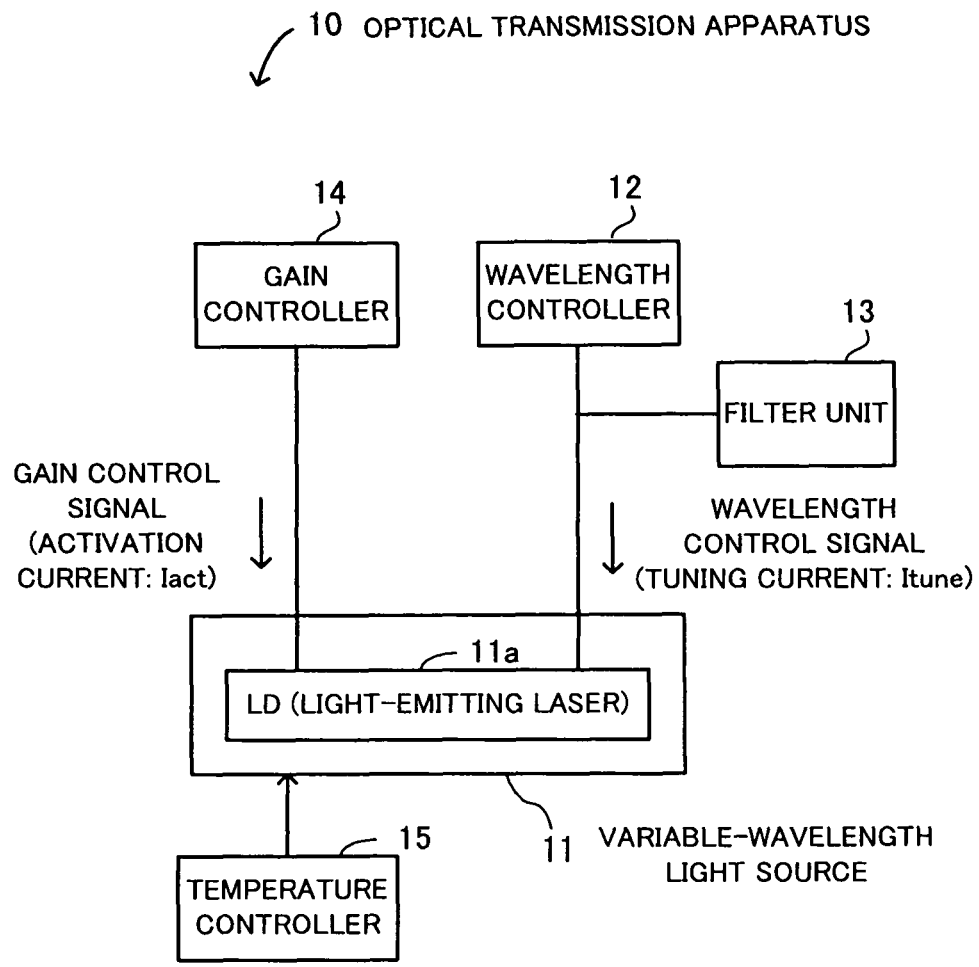
FIG. 1 illustrates the principle of an optical transmission apparatus.

Embodiments of the present invention will be described below with reference to the accompanying drawings, wherein like reference numerals refer to like elements throughout. FIG. 1 illustrates the principle of an optical transmission apparatus. The optical transmission apparatus 10 comprises a variable-wavelength light source 11 including a light-emitting laser (hereinafter laser diode (LD)) 11a, a wavelength controller 12, a filter unit 13, a gain controller 14, and a temperature controller 15.

The laser diode 11a has its wavelength set when applied with a wavelength control signal (hereinafter tuning current) for switching wavelengths, so that the output wavelength varies. The wavelength controller 12 outputs the tuning current to the laser diode 11a to perform wavelength control such that the output wavelength is set to a desired wavelength.

The filter unit 13, which has a high cutoff frequency, subjects the tuning current to a filtering process so as to remove high-frequency noise superimposed on the tuning current. The gain controller 14 outputs a gain control signal (hereinafter activation current) to the laser diode 11a to perform gain control for setting the gain for output light of the laser diode 11a. Specifically, the gain controller 14 controls the emission/non-emission of light from the laser diode 11a.

The temperature controller 15 carries out constant temperature control for setting the temperature of the laser diode 11a to a constant temperature. The temperature of the laser diode 11a needs to be stabilized before the emission of light. To this end, the laser diode 11a is placed on a TEC (Thermo Electric Cooler) for adjusting the laser diode temperature, and the constant temperature control of the laser diode 11a is performed with the use of the TEC.

The filter unit 13 stops the filtering process during the wavelength control and executes the filtering process during the operation. Details of the filtering process will be explained later with reference to FIG. 14. The wavelength controller 12, the filter unit 13, the gain controller 14 and the temperature controller 15 carry out their respective predetermined operations in accordance with instructions from a host controller.

Figure 2:
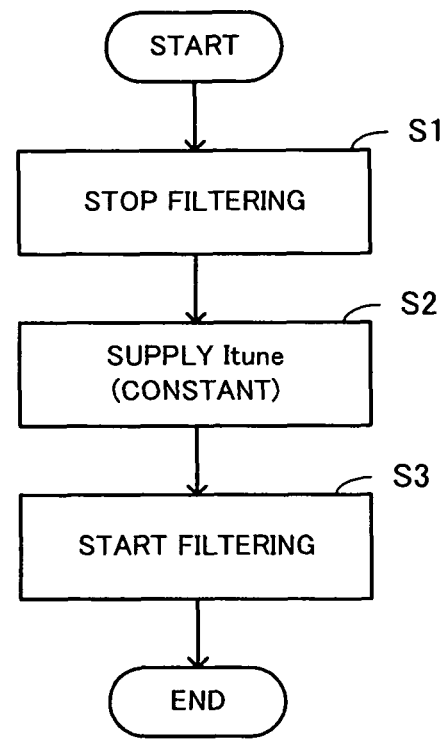
FIG. 2 is a flowchart illustrating how a wavelength controller and a filter unit are operated.

FIG. 2 is a flowchart illustrating how the wavelength controller 12 and the filter unit 13 are operated.

S1: The filter unit 13 stops the filtering process (OFF).

S2: After the filtering process is stopped, the wavelength controller 12 supplies the tuning current to the laser diode 11a to perform the wavelength control (control for setting the output wavelength of the laser diode 11a to a desired wavelength).

S3: During the operation subsequent to the wavelength control, the filter unit 13 executes the filtering process (ON). Namely, high-frequency noise is removed from the tuning current.

In this manner, during the wavelength control, the filtering process is stopped, and the tuning current on which high-frequency noise is superimposed is supplied directly to the laser diode 11a of the variable-wavelength light source 11 to set the wavelength to be output. During the operation following the wavelength setting, the filtering process is executed to remove high-frequency noise from the tuning current being supplied to the laser diode 11a.

When the wavelength control is performed, the filtering process is stopped and the wavelength is set by means of the tuning current containing high-frequency noise. At this time, therefore, the output from the laser diode 11a involves wavelength variation, but since no service is being provided (no optical signal is being sent to the transmission path), degradation of the transmission characteristic is not caused and nor is the receiving side adversely affected. During the operation, on the other hand, the filtering process is executed to remove high-frequency noise from the tuning current being supplied to the laser diode 11a.

Thus, during the wavelength control, the wavelength of the variable-wavelength light source 11 is set by using the unprocessed tuning current (on which high-frequency noise is superimposed), thus making it possible to carry out high-speed wavelength tuning (high-speed wavelength switching) as intended. On the other hand, during the operation, high-frequency noise is removed from the tuning current, whereby degradation of the transmission characteristic is suppressed.

Figure 3:
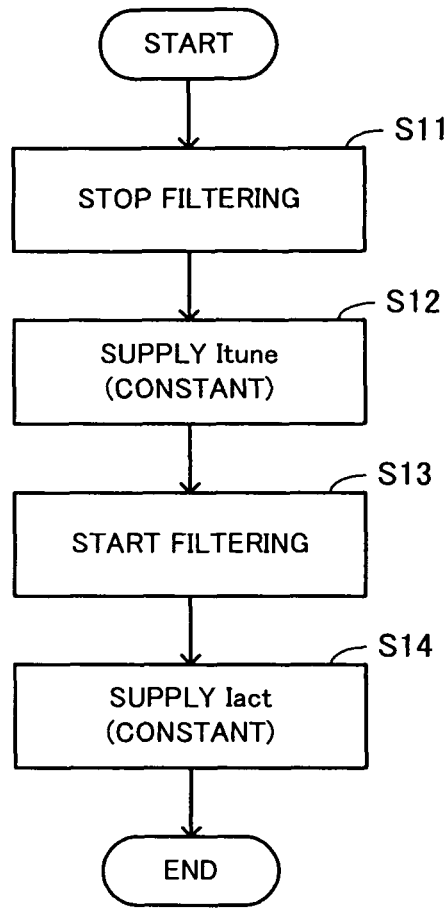
FIG. 3 is a flowchart illustrating the setup of the apparatus, including gain control.

The manner of how the optical transmission apparatus 10 is set up will be now described with reference to the flowchart of FIG. 3 illustrating the setup of the apparatus, including the gain control.

S11: The filter unit 13 stops the filtering process.

S12: After the filtering process is stopped, the wavelength controller 12 supplies the tuning current to the laser diode 11a to perform the wavelength control.

S13: During the operation subsequent to the wavelength control, the filter unit 13 executes the filtering process.

S14: After the filtering process is started, the gain controller 14 supplies the activation current to the laser diode 11a to carry out the gain control.

Figure 4:
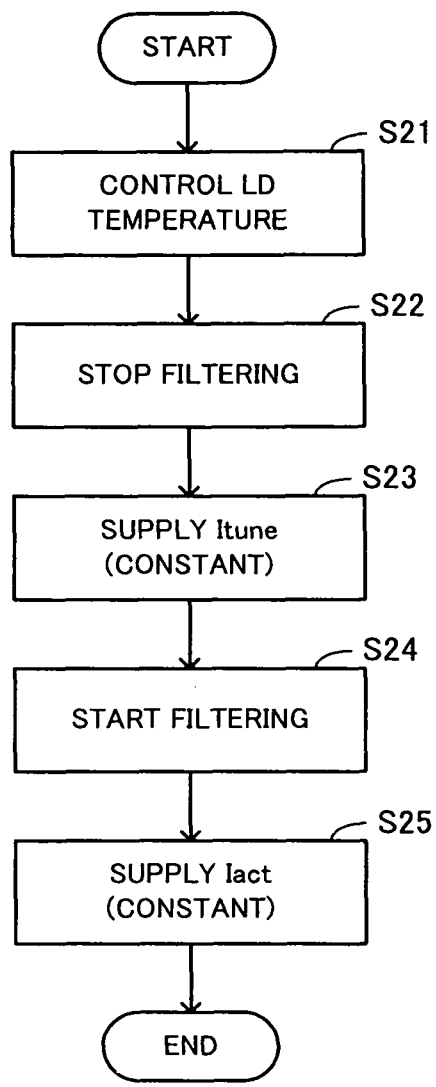
FIG. 4 is a flowchart illustrating the setup of the apparatus, including gain control and constant temperature control.

FIG. 4 is a flowchart illustrating the setup of the apparatus, including the gain control and the constant temperature control.

S21: The temperature controller 15 outputs a TEC current (current supplied to the TEC for adjusting the laser diode temperature) to perform the constant temperature control on the laser diode 11a.

S22: The filter unit 13 stops the filtering process.

S23: After the filtering process is stopped, the wavelength controller 12 supplies the tuning current to the laser diode 11a to carry out the wavelength control.

S24: During the operation following the wavelength control, the filter unit 13 executes the filtering process.

S25: After the filtering process is started, the gain controller 14 supplies the activation current to the laser diode 11a to execute the gain control. In the control flow explained above, the constant temperature control is carried out first but may be executed at any time insofar as it precedes the gain control for supplying the activation current.

Figure 5:
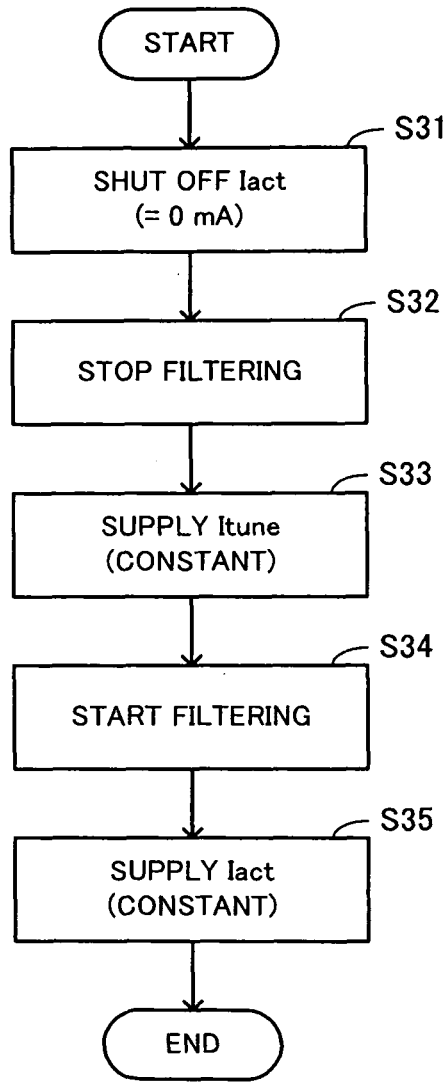
FIG. 5 is a flowchart illustrating the operation performed at the time of wavelength switching.

Operation of the optical transmission apparatus 10 at the time of wavelength switching will be now described with reference to the flowchart of FIG. 5 illustrating the operation performed at the time of wavelength switching.

S31: The gain controller 14 shuts off the activation current (Iact=0 mA).

S32: The filter unit 13 stops the filtering process.

S33: After the filtering process is stopped, the wavelength controller 12 supplies the tuning current to the laser diode 11a to perform the wavelength control. In the case of switching the wavelength from λa to λb, for example, the wavelength control is carried out by supplying the laser diode 11a with a new tuning current for setting the wavelength λb.

S34: During the operation subsequent to the wavelength control, the filter unit 13 executes the filtering process.

S35: After the filtering process is started, the gain controller 14 supplies the activation current to the laser diode 11a to execute the gain control.

As stated above, after the emission of light is once stopped by shutting off the activation current, the wavelength control is executed, and the supply of the activation current is restarted thereafter to cause the laser diode 11a to emit light. At the time of switching wavelengths, it is unnecessary to vary the TEC temperature.

Figure 6:
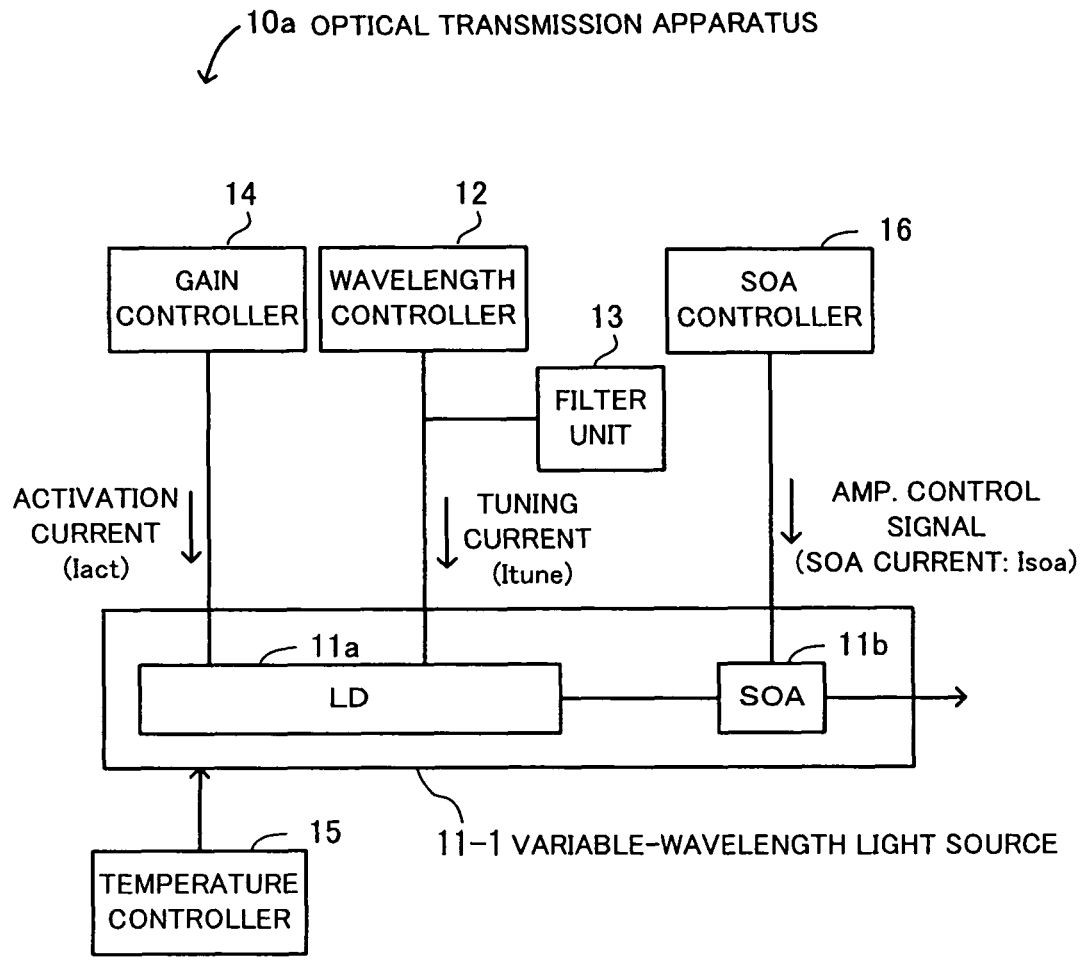
FIG. 6 illustrates the configuration of an optical transmission apparatus.

The following describes an optical transmission apparatus having an optical amplifier included in the variable-wavelength light source 11. FIG. 6 illustrates the configuration of such an optical transmission apparatus. The optical transmission apparatus 10a comprises a variable-wavelength light source 11-1 including the laser diode 11a and an optical amplifier (hereinafter SOA) 11b, the wavelength controller 12, the filter unit 13, the gain controller 14, the temperature controller 15, and an optical amplification controller (hereinafter SOA controller) 16. In the following description, like reference numerals are used to denote like elements already explained above, and description of such elements is omitted.

The SOA 11b amplifies the output light from the laser diode 11a. The SOA controller 16 outputs an optical amplification control signal (hereinafter SOA current) to perform optical amplification control (hereinafter SOA control) for setting the optical amplification factor of the SOA 11b.

Figure 7:
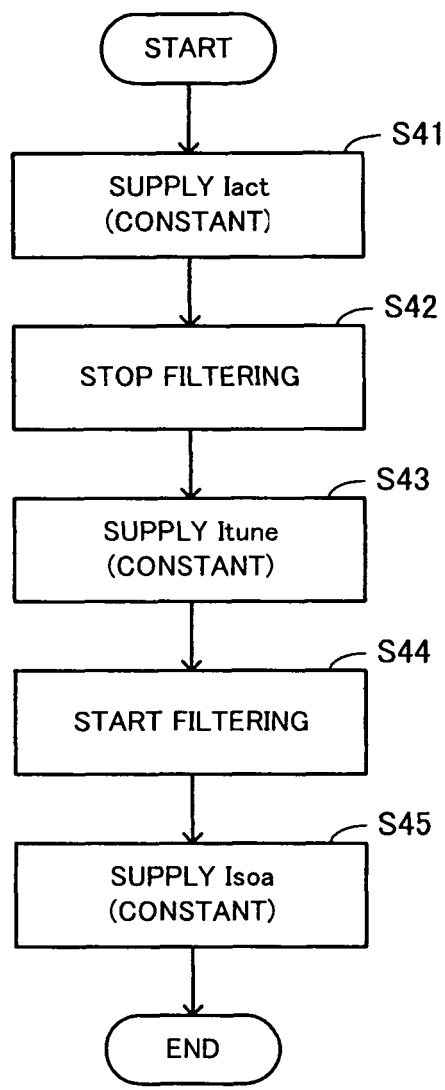
FIG. 7 is a flowchart illustrating the setup of the apparatus, including gain control and SOA control.

The manner of how the optical transmission apparatus 10a is set up will be now described with reference to the flowchart of FIG. 7 illustrating the setup of the apparatus, including the gain control and the SOA control.

S41: The gain controller 14 supplies the activation current to the laser diode 11a.

S42: The filter unit 13 stops the filtering process.

S43: After the filtering process is stopped, the wavelength controller 12 supplies the tuning current to the laser diode 11a to perform the wavelength control.

S44: During the operation following the wavelength control, the filter unit 13 executes the filtering process.

S45: After the filtering process is started, the SOA controller 16 supplies the SOA current to the laser diode 11a to execute the SOA control.

As stated above, when the variable-wavelength light source 11-1 including the SOA 11b is set up, the SOA control needs to be executed after the wavelength control, because the emission/non-emission of light is controlled by the SOA current. The supply of the activation current may be started at any time insofar as it precedes the SOA control.

Figure 8:
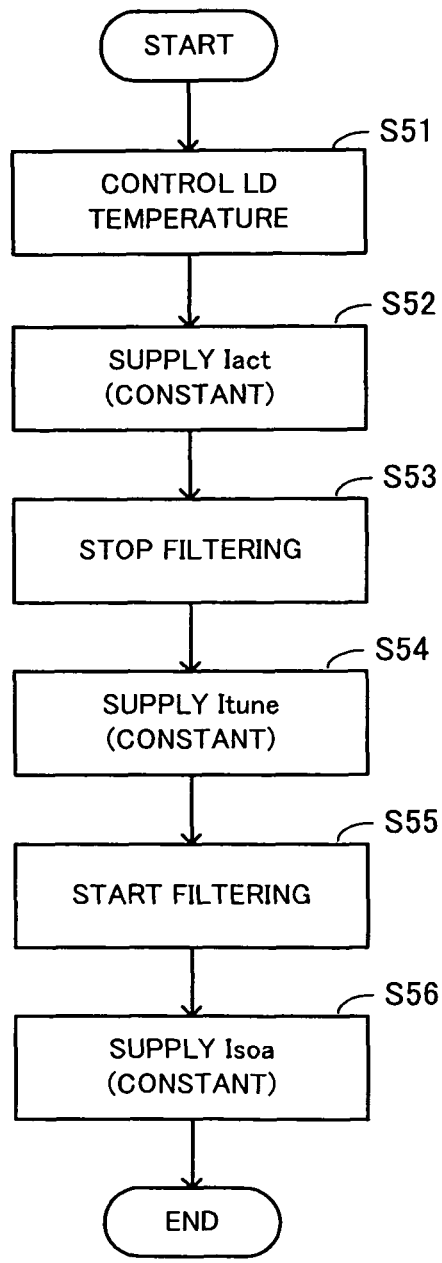
FIG. 8 is a flowchart illustrating the setup of the apparatus, including gain control, SOA control and constant temperature control.

FIG. 8 is a flowchart illustrating the setup of the apparatus, including the gain control, the SOA control and the constant temperature control.

S51: The temperature controller 15 outputs the TEC current to perform the constant temperature control on the laser diode 11a.

S52: The gain controller 14 supplies the activation current to the laser diode 11a.

S53: The filter unit 13 stops the filtering process.

S54: After the filtering process is stopped, the wavelength controller 12 supplies the tuning current to the laser diode 11a to carry out the wavelength control.

S55: During the operation following the wavelength control, the filter unit 13 executes the filtering process.

S56: After the filtering process is started, the SOA controller 16 supplies the SOA current to the laser diode 11a to execute the optical amplification control. In the control flow explained above, the constant temperature control is carried out first but may be executed at any time insofar as it precedes the SOA control for supplying the SOA current.

Figure 9:
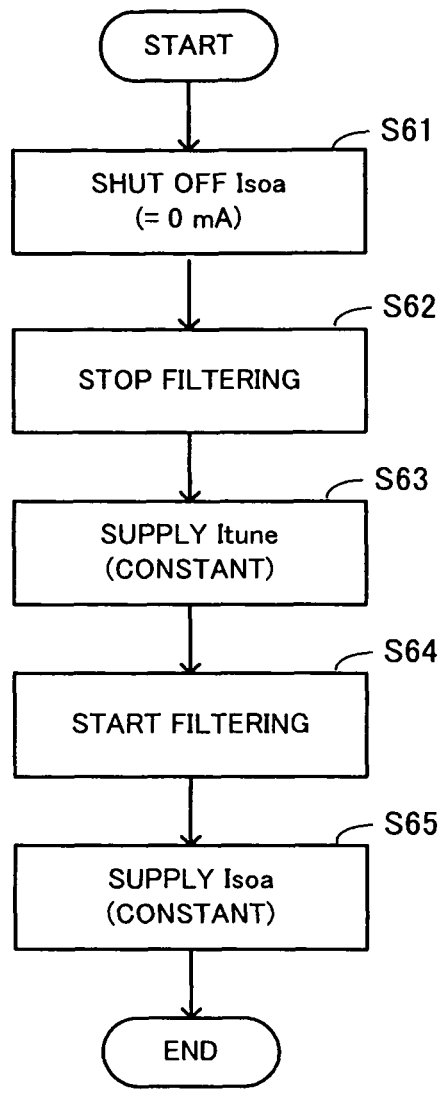
FIG. 9 is a flowchart illustrating the operation performed at the time of wavelength switching.

The manner of how the optical transmission apparatus 10a operates at the time of wavelength switching will be now described with reference to the flowchart of FIG. 9 illustrating the operation performed at the time of wavelength switching.

S61: The SOA controller 16 shuts off the SOA current (Isoa=0 mA).

S62: The filter unit 13 stops the filtering process.

S63: After the filtering process is stopped, the wavelength controller 12 supplies the tuning current to the laser diode 11a to perform the wavelength control. For example, where the wavelength is switched from λa to λb, the wavelength control is executed by supplying the laser diode 11a with a new tuning current for setting the wavelength λb.

S64: During the operation subsequent to the wavelength control, the filter unit 13 executes the filtering process.

S65: After the filtering process is started, the SOA controller 16 supplies the SOA current to the laser diode 11a to execute the SOA control.

As stated above, after the emission of light is once stopped by shutting off the SOA current, the wavelength control is executed, and the supply of the SOA current is restarted thereafter to cause the laser diode 11a to emit light. At the time of switching wavelengths, it is unnecessary to vary the TEC temperature.

Figure 10:
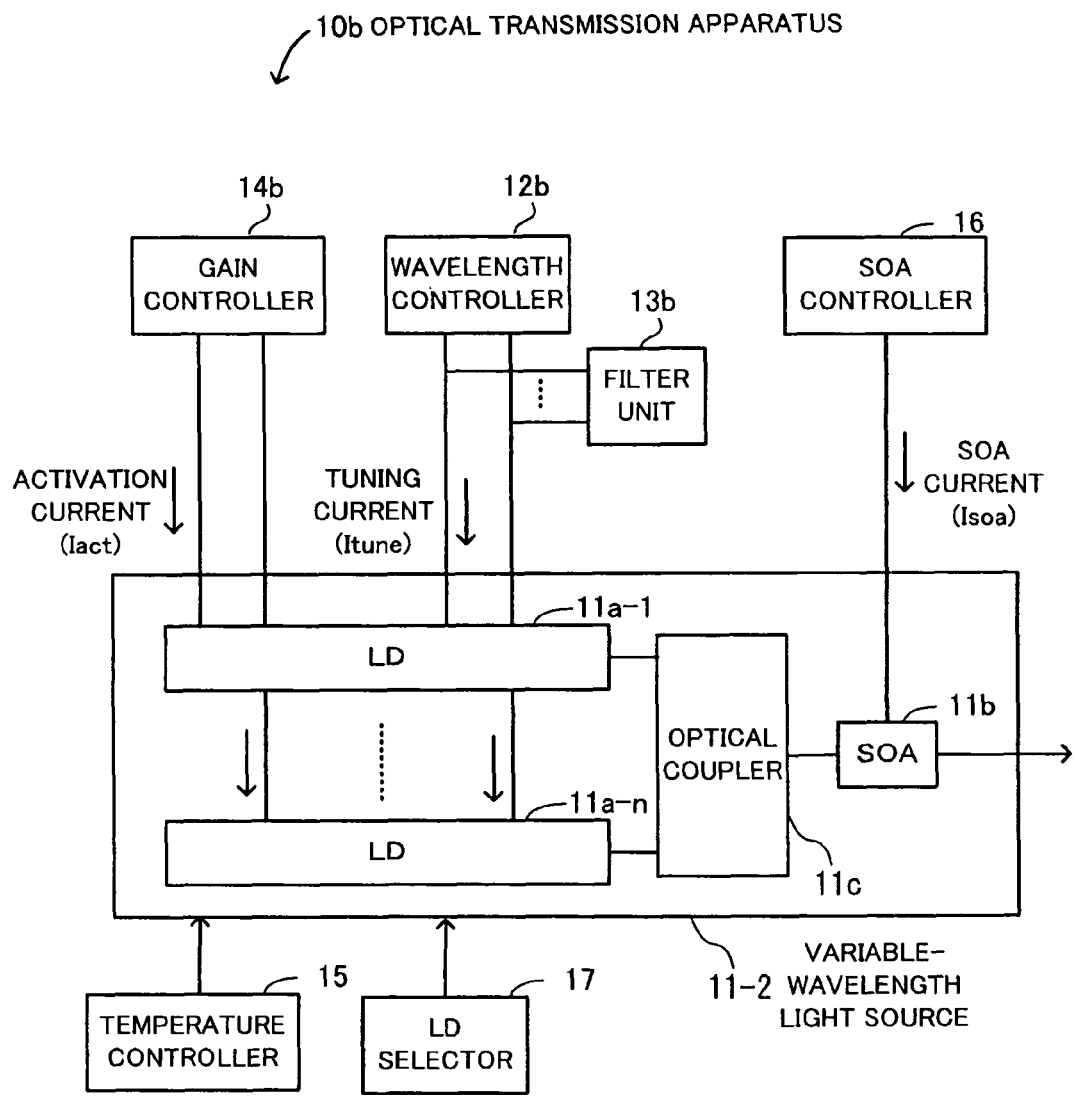
FIG. 10 illustrates the configuration of an optical transmission apparatus.

The following describes an optical transmission apparatus including a plurality of laser diodes. FIG. 10 illustrates the configuration of such an optical transmission apparatus. The optical transmission apparatus 10b comprises a variable-wavelength light source 11-2, a wavelength controller 12b, a filter unit 13b, a gain controller 14b, the temperature controller 15, the SOA controller 16, and a laser diode selector 17. The variable-wavelength light source 11-2 includes a plurality of laser diodes 11a-1 to 11a-n (laser diode array), an SOA 11b, and an optical coupler 11c.

The laser diode selector 17 selects a desired laser diode from among the laser diodes 11a-1 to 11a-n. The wavelength controller 12b, the filter unit 13b and the gain controller 14b have functions basically identical with those explained above with reference to FIG. 1 but are configured to perform their respective control operations on the laser diode selected from among the multiple laser diodes 11a-1 to 11a-n.

In the variable-wavelength light source 11-2, on the other hand, the wavelength output end of each of the laser diodes 11a-1 to 11a-n and the wavelength input end of the SOA 11b are coupled by the optical coupler 11c such that the wavelength output from the selected one of the laser diodes 11a-1 to 11a-n is amplified by the SOA 11b and output to the outside of the apparatus.

Figure 11:
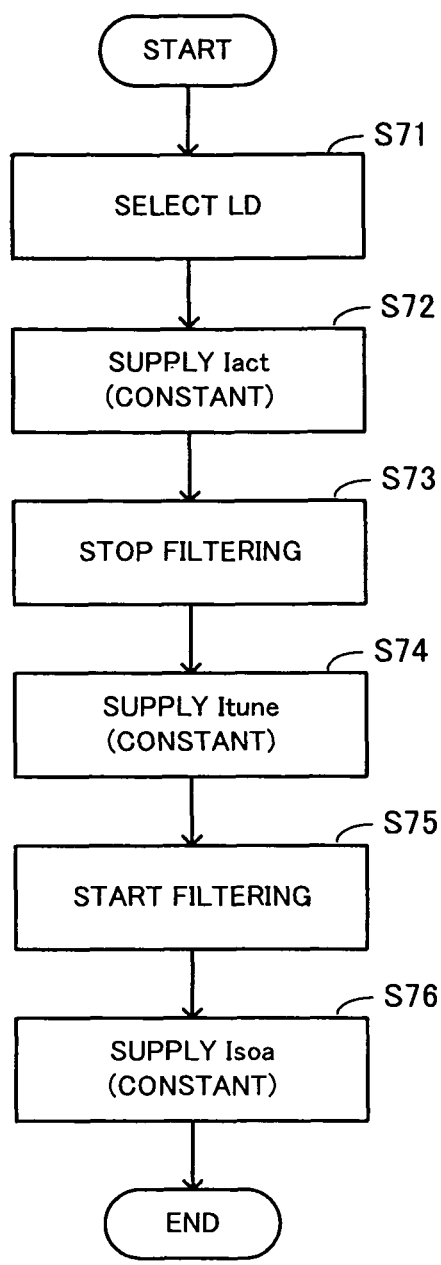
FIG. 11 is a flowchart illustrating the setup of the apparatus, including gain control and SOA control.

The manner of how the optical transmission apparatus 10b is set up will be now described with reference to the flowchart of FIG. 11 illustrating the setup of the apparatus, including the gain control and the SOA control.

S71: The laser diode selector 17 selects a laser diode to be used, from among the laser diodes 11a-1 to 11a-n (it is assumed that the laser diode 11a-1 is selected).

S72: The gain controller 14b supplies the activation current to the laser diode 11a-1.

S73: The filter unit 13b stops the filtering process.

S74: After the filtering process is stopped, the wavelength controller 12b supplies the tuning current to the laser diode 11a-1 to perform the wavelength control.

S75: During the operation following the wavelength control, the filter unit 13b executes the filtering process.

S76: After the filtering process is started, the SOA controller 16 supplies the SOA current to the laser diode 11a-1 to execute the SOA control.

Since the emission/non-emission of light is controlled by the SOA current as stated above, it is necessary that the selection of a laser diode to be used, the wavelength control and the SOA control be executed in the mentioned order. The supply of the activation current may be started at any time insofar as it succeeds the selection of a laser diode and precedes the SOA control.

Figure 12:
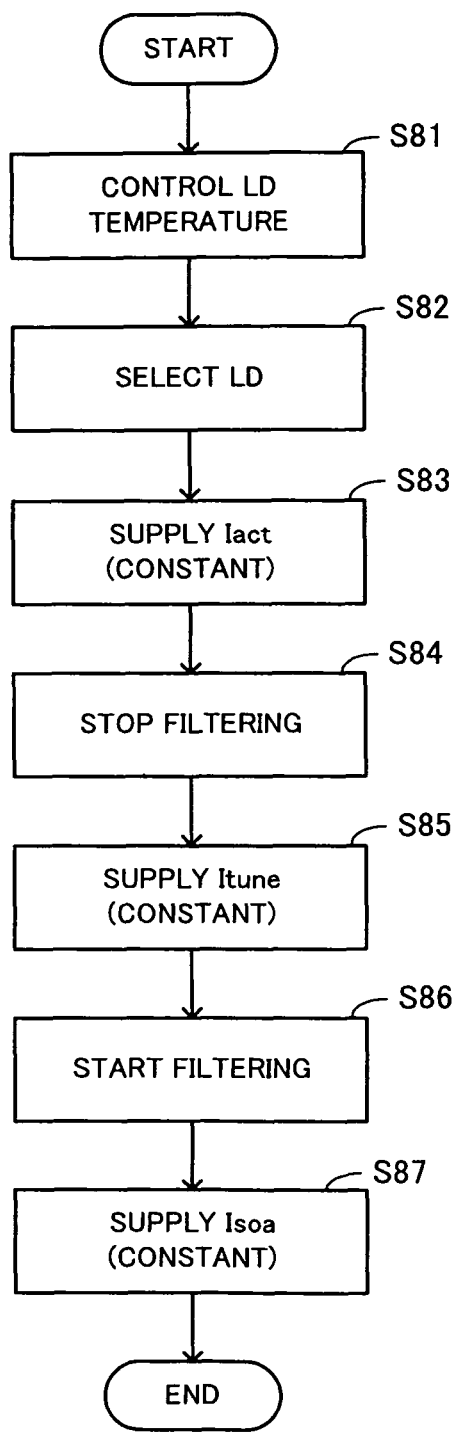
FIG. 12 is a flowchart illustrating the setup of the apparatus, including gain control, SOA control and constant temperature control.

FIG. 12 is a flowchart illustrating the setup of the apparatus, including the gain control, the SOA control and the constant temperature control.

S81: The temperature controller 15 outputs the TEC current to perform the constant temperature control on the laser diode array constituted by the laser diodes 11a-1 to 11a-n.

S82: The laser diode selector 17 selects a laser diode to be used, from among the laser diodes 11a-1 to 11a-n (it is assumed that the laser diode 11a-1 is selected).

S83: The gain controller 14b supplies the laser diode 11a-1 with the activation current.

S84: The filter unit 13b stops the filtering process.

S85: After the filtering process is stopped, the wavelength controller 12b supplies the tuning current to the laser diode 11a-1 to perform the wavelength control.

S86: During the operation following the wavelength control, the filter unit 13b executes the filtering process.

S87: After the filtering process is started, the SOA controller 16 supplies the laser diode 11a-1 with the SOA current to execute the SOA control. In the above control flow, the constant temperature control is performed first but may be executed at any time insofar as it precedes the SOA control for supplying the SOA current.

Figure 13:
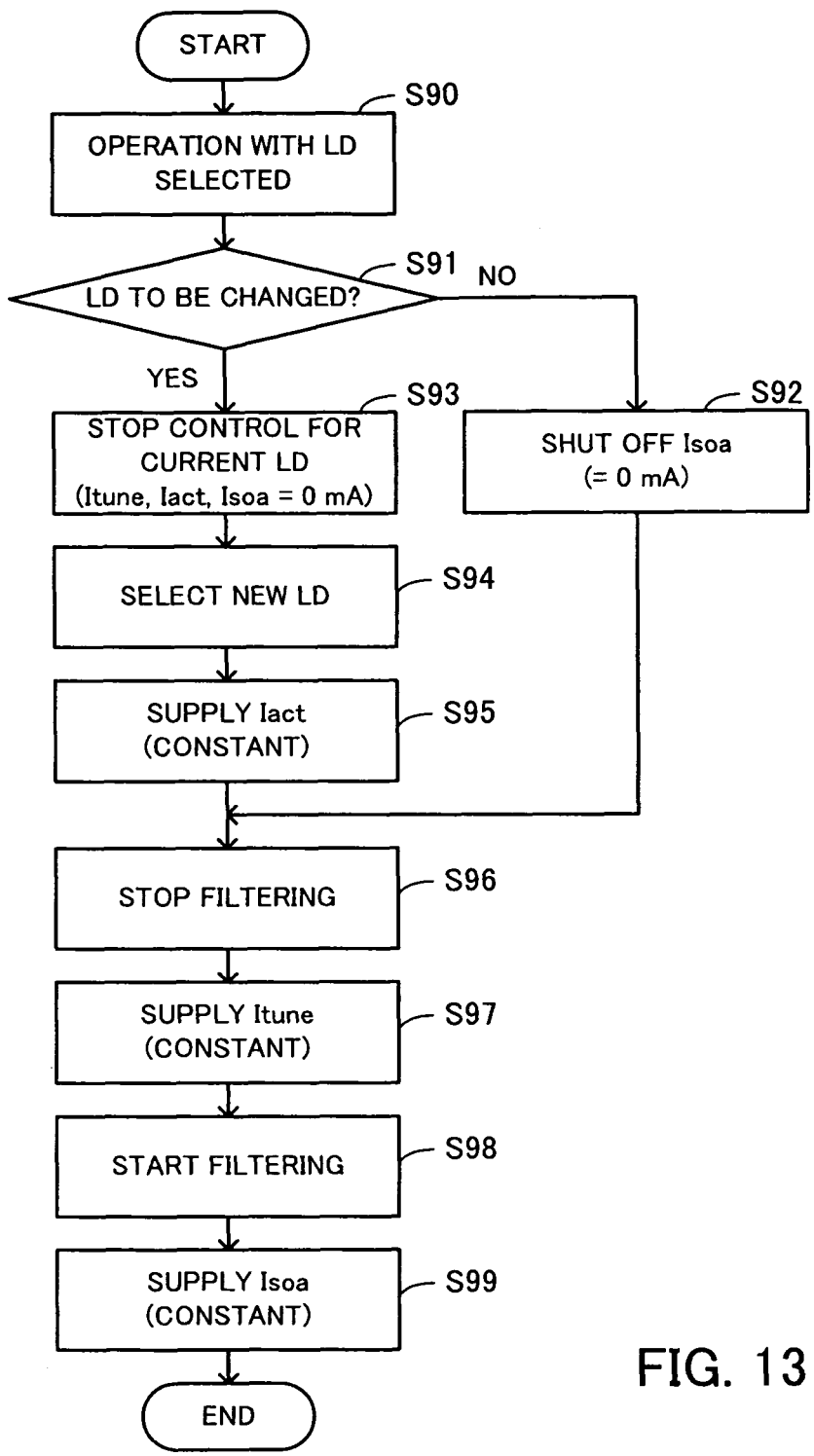
FIG. 13 is a flowchart illustrating the operation performed at the time of wavelength switching.

The manner of how the optical transmission apparatus 10b operates at the time of wavelength switching will be now described with reference to the flowchart of FIG. 13 illustrating the operation performed at the time of wavelength switching.

S90: The system is being operated with a certain laser diode selected (it is assumed that the laser diode 11a-1 is currently selected).

S91: On detecting a changeover of wavelengths, the host controller determines whether or not it is necessary to change laser diodes. If the laser diode need not be changed (if the wavelength to be switched to falls within the wavelength range covered by the currently used laser diode 11a-1), the flow proceeds to Step S92. If the laser diode needs to be changed to another one (if the wavelength to be switched to is outside the wavelength range of the currently used laser diode 11a-1), the flow proceeds to Step S93.

S92: The SOA controller 16 shuts off the SOA current, whereupon the flow proceeds to Step S96.

S93: The wavelength controller 12b shuts off the tuning current being supplied to the laser diode 11a-1, the gain controller 14b shuts off the activation current being supplied to the laser diode 11a-1, and the SOA controller 16 shuts off the SOA current.

S94: The laser diode selector 17 selects a new laser diode to be used, from among the laser diodes 11a-2 to 11a-n (it is assumed that the laser diode 11a-2 is selected).

S95: The gain controller 14b supplies the activation current to the laser diode 11a-2.

S96: The filter unit 13b stops the filtering process.

S97: After the filtering process is stopped, the wavelength controller 12b supplies the tuning current to the laser diode 11a-2 to perform the wavelength control.

Where the laser diode need not be changed, for example, if the wavelength is switched from λa to λb, the wavelength control is carried out by supplying the laser diode 11a-1 with a new tuning current for setting the wavelength λb.

On the other hand, where the laser diode needs to be changed, for example, if the wavelength is switched from the wavelength λa covered by the laser diode 11a-1 to a wavelength λc covered by the laser diode 11a-2, the wavelength control is executed by supplying the laser diode 11a-2 with a new tuning current for setting the wavelength λc.

S98: During the operation subsequent to the wavelength control, the filter unit 13b executes the filtering process.

S99: After the filtering process is started, the SOA controller 16 supplies the SOA current to the currently selected laser diode to execute the SOA control.

As stated above, where the laser diode needs to be changed at the time of wavelength switching, the tuning current, the activation current and the SOA current are shut off, and after a new laser diode is selected, the wavelength control and then the SOA control are executed. The supply of the activation current may be started at any time insofar as it succeeds the selection of a new laser diode and precedes the SOA control. Where the laser diode need not be changed, on the other hand, the SOA current is shut off so that the emission of light may be once stopped, then the wavelength control is executed anew, and the supply of the SOA current is restarted to cause the laser diode to emit light. At the time of switching wavelengths, it is unnecessary to vary the TEC temperature.

Figure 14:
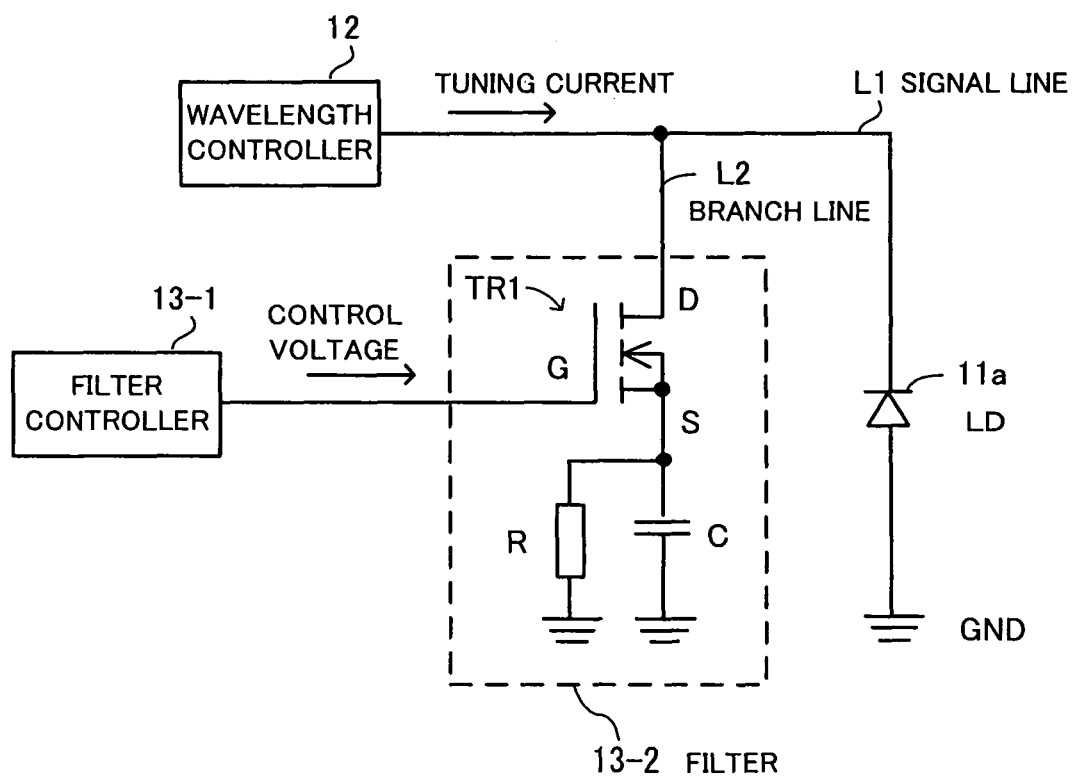
FIG. 14 illustrates the configuration of a filter unit.

The filtering process will be now explained. FIG. 14 illustrates the configuration of the filter unit 13. The filter unit 13 comprises a filter controller 13-1 and a filter 13-2. The filter 13-2 comprises an FET switch constituted by a transistor TR1 (e.g., N-channel MOSFET), and a time constant circuit including a resistor R and a capacitor C. The wavelength control layer (tune) of the laser diode 11a is represented equivalently by a diode.

The wavelength controller 12 has its tuning current output end connected through a signal line L1 to the cathode of the laser diode 11a, the anode of which is grounded (GND). A branch line L2 branches off from the signal line L1, and the filter 13-2 is inserted in the branch line L2.

The filter controller 13-1 has its control voltage output end connected to the gate of the transistor TR1, of which the source is connected to one end of each of the resistor R and the capacitor C. The other end of each of the resistor R and the capacitor C is grounded. The drain of the transistor TR1 is connected to the tuning current output end of the wavelength controller 12 and the cathode of the laser diode 11a.

When the filtering process is to be stopped, the filter controller 13-1 stops the application of the control voltage to the gate of the transistor TR1 to turn off the FET switch. Thereupon, the tuning current output from the wavelength controller 12 (the tuning current on which high-frequency noise is superimposed) is injected into the laser diode 11a through the signal line L1, so that the wavelength setting of the laser diode 11a is carried out (since, during the wavelength control, no light is output to outside from the apparatus as stated above, no problem arises if the wavelength setting is executed using the tuning current on which high-frequency noise is superimposed, and in addition, this procedure enables high-speed tuning).

On the other hand, when starting the filtering process, the filter controller 13-1 applies the control voltage to the gate of the transistor TR1 to turn on the FET switch constituted by the transistor TR1. Thereupon, of the tuning current output from the wavelength controller 12, the high-frequency component (containing high-frequency noise) of the tuning current flows to the branch line L2, while the DC component of the tuning current flows through the signal line L1 and is injected into the laser diode 11a (for the high-frequency signal, the capacitor C in the time constant circuit appears to have low impedance, so that only the high-frequency component of the tuning current flows to the branch line L2; conversely, for the direct-current signal, the capacitor C appears to have high impedance, so that the direct-current signal flows to the signal line L1, and not to the branch line L2).

In the above example, the ON/OFF control of the filter 13-2 is executed by using the voltage-controlled FET switch but may alternatively be executed by using a current-controlled bipolar transistor (e.g., NPN transistor), instead of an FET.

Figure 15:
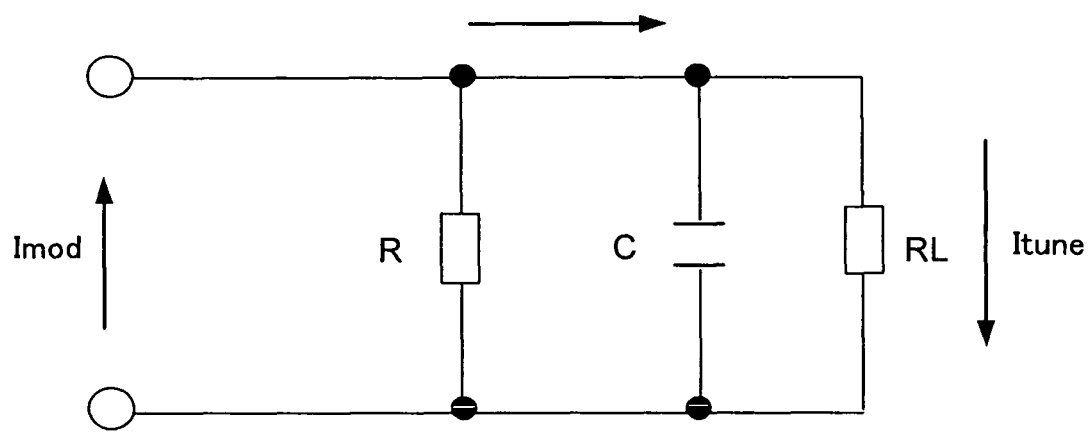
FIG. 15 illustrates an equivalent circuit of a filter and a laser diode.

A design example of the filter 13-2 will be now described. FIG. 15 illustrates an equivalent circuit of the filter 13-2 and the laser diode 11a, wherein the FFT switch is in an ON state. Given the impressed current Imod, the tuning current Itune can be calculated by the following equation:

$$Itune = R \times (1/j\omega C)/(R \times (RL+(1/j\omega C))+RL \times (1/j\omega C)) \times Imod \quad (1)$$

where RL is the load resistance of the laser diode 11a.

Let us suppose that the C and R values of the time constant circuit are determined so as to suppress the high-frequency noise of 100 kHz and above. In this case, since the load resistance RL of the laser diode 11a is about 5Ω, R is set so as to provide an impedance significantly higher than RL, for example, to 500Ω, which is 100 times as large as RL.

Figure 16:
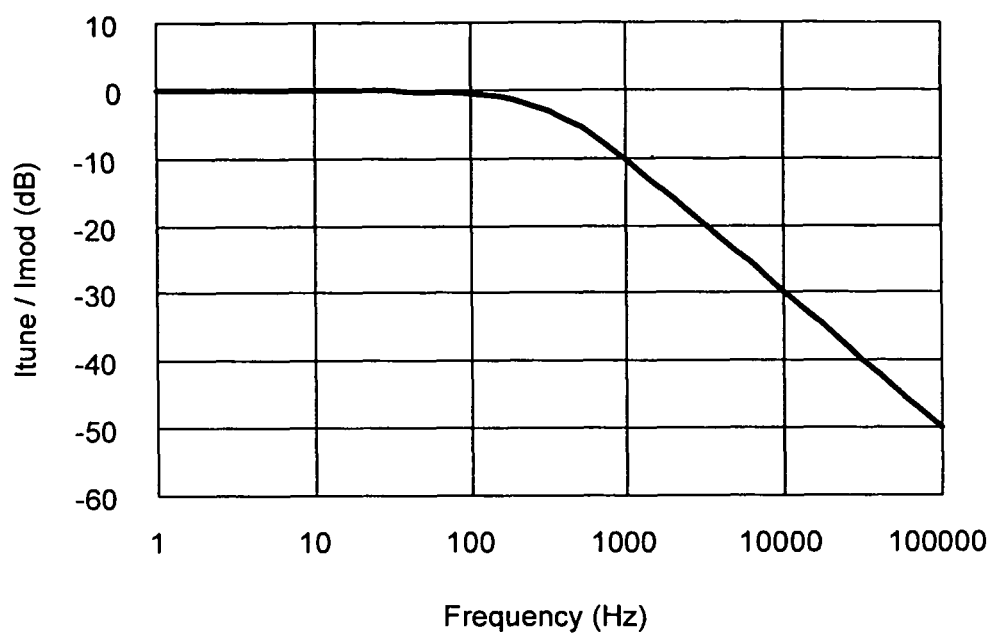
FIG. 16 illustrates the transmission characteristic of the filter.
Figure 17:
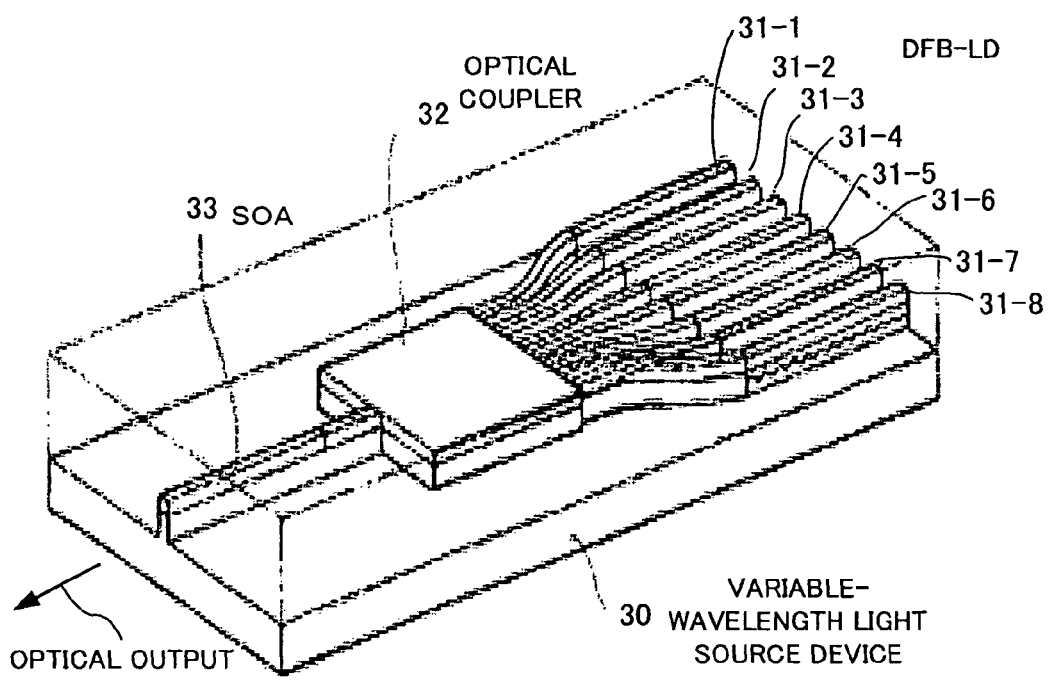
FIG. 17 illustrates the configuration of a variable-wavelength light source device.
Figure 18:
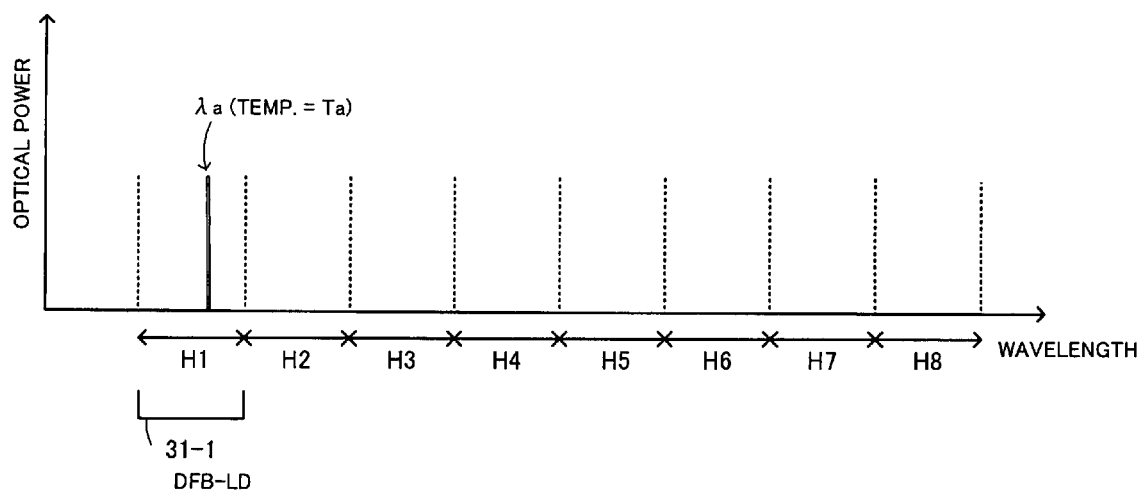
FIG. 18 illustrates the operation of the variable-wavelength light source device.
Figure 19:
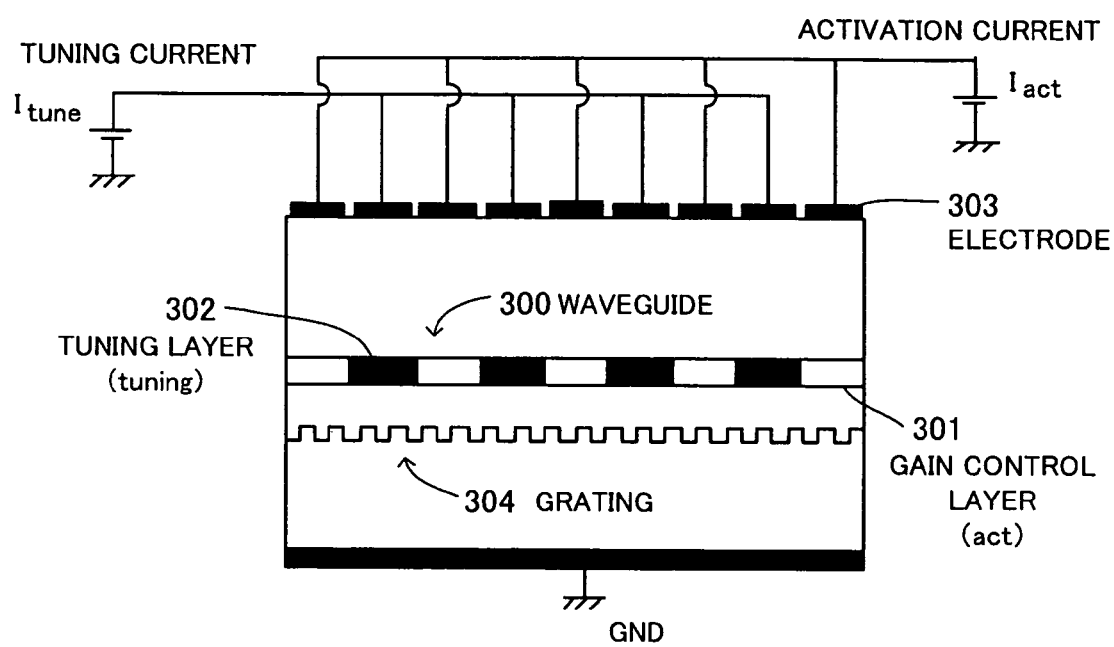
FIG. 19 illustrates the structure of a current injection-type DFB-LD.
Figure 20:
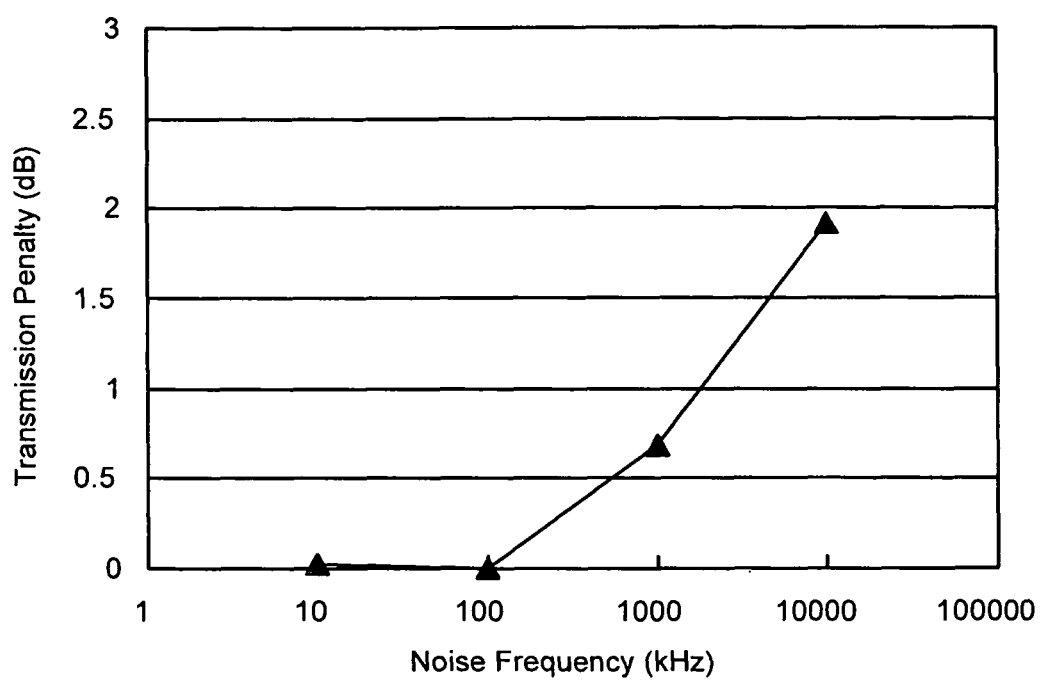
FIG. 20 illustrates the relationship between current noise and transmission penalty.

On the other hand, C is a parameter determining the cutoff frequency and, in this instance, is set to 100 nF so that the attenuation may begin from 100 kHz. FIG. 16 illustrates the transmission characteristic of the filter 13-2, wherein the horizontal axis indicates frequency (Hz) and the vertical axis indicates power Itune/Imod (dB). In the filter transmission characteristic illustrated in FIG. 16, R=500Ω and C=100 nF. By setting C to a greater value, it is possible to cause the attenuation to begin from a lower frequency.

The optical transmission apparatus of the present invention includes a light-emitting laser whose output wavelength varies when applied with a wavelength control signal for switching wavelengths, a wavelength controller configured to perform wavelength control for setting a desired output wavelength, and a filter unit configured remove high-frequency noise superimposed on the wavelength control signal, wherein the filter unit stops the filtering process during the wavelength control and executes the filtering process during the operation. It is therefore possible to suppress degradation in the transmission characteristics attributable to high-frequency noise superimposed on the wavelength control signal and at the same time to perform wavelength switching at high speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. An optical transmission apparatus comprising:
a variable-wavelength light source including a light-emitting laser whose output wavelength varies when applied with a wavelength tuning signal for switching wavelengths;
a wavelength controller configured to output the wavelength tuning signal to the variable-wavelength light source to perform wavelength control such that the output wavelength is set to a desired wavelength; and a filter configured to subject the wavelength tuning signal to a filtering process to remove noise superimposed on the wavelength tuning signal,
wherein the filter stops the filtering process at a time of switching wavelengths before operation of an optical transmission and executes the filtering process while holding wavelengths constant during the operation of the optical transmission.

2. The optical transmission apparatus according to claim 1, wherein:
after the filtering process is stopped, the wavelength controller performs the wavelength control by applying the wavelength tuning signal to the light-emitting laser, and
after the wavelength control is performed, the filter executes the filtering process.

3. The optical transmission apparatus according to claim 2, further comprising a gain controller configured to apply a gain control signal to the light-emitting laser to perform gain control for setting a gain for output light of the light-emitting laser.

4. The optical transmission apparatus according to claim 3, wherein, when the optical transmission apparatus is set up, the gain controller performs the gain control by applying the gain control signal to the light-emitting laser after the filtering process is started.

5. The optical transmission apparatus according to claim 3, further comprising a temperature controller configured to perform constant temperature control for setting temperature of the light-emitting laser to a constant temperature,
wherein, when the optical transmission apparatus is set up, the temperature controller performs the constant temperature control before the gain control signal is applied to the light-emitting laser.

6. The optical transmission apparatus according to claim 3, wherein, when the output wavelength is switched from a first wavelength to a second wavelength,
the gain controller stops application of the gain control signal,
the filter stops the filtering process,
the wavelength controller performs, after stoppage of the filtering process, the wavelength control by applying, to the light-emitting laser, the wavelength tuning signal for switching the output wavelength from the first wavelength to the second wavelength,
the filter executes the filtering process after the wavelength control, and
the gain controller performs, after start of the filtering process, the gain control by applying the gain control signal to the light-emitting laser.

7. The optical transmission apparatus according to claim 1, wherein:
the filter includes a switch and a time constant circuit and is inserted in a branch line branching off from a signal line which connects the wavelength controller to the light-emitting laser,
when the filtering process is to be stopped, the filter performs switching such that the wavelength tuning signal on which the noise is superimposed flows to the light-emitting laser through the signal line, and
when the filtering process is to be executed, the filter performs switching such that a high-frequency component of the wavelength tuning signal containing the noise flows to the branch line while a direct-current component of the wavelength tuning signal flows to the signal line.

8. The optical transmission apparatus according to claim 1, wherein:
the variable-wavelength light source includes the light-emitting laser and an optical amplifier configured to amplify the output wavelength from the light-emitting laser, and
the optical transmission apparatus further comprises an optical amplification controller configured to perform optical amplification control by outputting an optical amplification control signal for setting an optical amplification factor of the optical amplifier.

9. An optical transmission apparatus comprising:
a variable-wavelength light source including a plurality of light-emitting lasers whose output wavelengths vary within respective different wavelength ranges when applied with a wavelength tuning signal for switching wavelengths;
a laser selector configured to select one light-emitting laser from among the plurality of light-emitting lasers,
a wavelength controller configured to output the wavelength tuning signal to the selected light-emitting laser to perform wavelength control such that the output wavelength is set to desired wavelength;
a filter configured to subject the wavelength tuning signal to a filtering process to remove noise superimposed on the wavelength tuning signal; and
wherein the filter stops the filtering process at a time of switching wavelengths before operation of an optical transmission and executes the filtering process while holding wavelengths constant during the operation of the optical transmission.

10. The optical transmission apparatus according to claim 9, wherein:
after the filtering process is stopped, the wavelength controller performs the wavelength control by applying the wavelength tuning signal to the selected light-emitting laser, and
after the wavelength control is performed, the filter executes the filtering process.

11. The optical transmission apparatus according to claim 10, further comprising:
a gain controller configured to apply a gain control signal to the selected light-emitting laser to perform gain control for setting a gain for output light of the selected light-emitting laser;
an optical amplifier configured to amplify output light from the selected light-emitting laser; and
an optical amplification controller configured to apply an optical amplification control signal to the optical amplifier, to perform optical amplification control for setting an optical amplification factor of the optical amplifier.

12. The optical transmission apparatus according to claim 11, wherein, when the optical transmission apparatus is set up, the gain controller performs the gain control by applying the gain control signal to the selected light-emitting laser before the optical amplification control signal is applied to the optical amplifier.

13. The optical transmission apparatus according to claim 11, further comprising a temperature controller configured to perform constant temperature control for setting temperature of the light-emitting lasers to a constant temperature,
wherein, when the optical transmission apparatus is set up, the temperature controller performs the constant temperature control before the optical amplification control signal is applied to the optical amplifier.

14. The optical transmission apparatus according to claim 11, wherein, when the optical transmission apparatus is set up, the optical amplification controller performs the optical amplification control by applying the optical amplification control signal to the optical amplifier after the filtering process is started.

15. The optical transmission apparatus according to claim 11, wherein, when the output wavelength is switched from a first wavelength to a second wavelength and if it is unnecessary to change a currently used light-emitting laser to a different one,
the optical amplification controller stops application of the optical amplification control signal,
the filter stops the filtering process,
the wavelength controller performs, after stoppage of the filtering process, the wavelength control by applying, to the currently used light-emitting laser, the wavelength tuning signal for switching the output wavelength from the first wavelength to the second wavelength,
the filter executes the filtering process after the wavelength control, and
the optical amplification controller performs, after start of the filtering process, the optical amplification control by applying the optical amplification control signal to the optical amplifier.

16. The optical transmission apparatus according to claim 11, wherein, when the output wavelength is switched from a first wavelength to a second wavelength and if a first light-emitting laser which is currently used and which is configured to output the first wavelength needs to be changed to a second light-emitting laser configured to output the second wavelength,
the wavelength controller stops application of the wavelength tuning signal to the first light-emitting laser, the gain controller stops application of the gain control signal to the first light-emitting laser, and the optical amplification controller stops application of the optical amplification control signal,
the laser selector selects the second light-emitting laser,
the filter stops the filtering process,
the wavelength controller performs, after stoppage of the filtering process, the wavelength control by applying, to the second light-emitting laser, the wavelength tuning signal for switching the output wavelength from the first wavelength to the second wavelength,
the filter executes the filtering process after the wavelength control, and
the optical amplification controller performs, after start of the filtering process, the optical amplification control by applying the optical amplification control signal to the optical amplifier.

17. The optical transmission apparatus according to claim 9, wherein:
the filter includes a switch and a time constant circuit and is inserted in a branch line branching off from a signal line which connects the wavelength controller to the selected light-emitting laser,
when the filtering process is to be stopped, the filter performs switching such that the wavelength tuning signal on which the noise is superimposed flows to the selected light-emitting laser through the signal line, and
when the filtering process is to be executed, the filter performs switching such that a high-frequency component of the wavelength tuning signal containing the noise flows to the branch line while a direct-current component of the wavelength tuning signal flows to the signal line.

18. An optical transmission method to be used in conjunction with a light-emitting laser whose output wavelength varies when applied with a wavelength tuning signal for switching wavelengths,
wherein a desired output wavelength is set in the light-emitting laser by applying the wavelength tuning signal to the light-emitting laser during wavelength control, and the wavelength tuning signal is subjected to a filtering process to remove noise superimposed on the wavelength tuning signal, and
wherein the filtering process is stopped at a time of switching wavelengths before operation of an optical transmission and is performed while holding wavelengths constant during the operation of the optical transmission.

* * * * *